United States Patent
Choi et al.

(10) Patent No.: US 8,130,086 B2
(45) Date of Patent: Mar. 6, 2012

(54) LINEAR VIBRATION GENERATOR

(75) Inventors: Joon Choi, Suwon-si (KR); Min-Young So, Anyang-si (KR); Hwa-Young Oh, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 310 days.

(21) Appl. No.: 12/153,078

(22) Filed: May 13, 2008

(65) Prior Publication Data

US 2008/0306332 A1    Dec. 11, 2008

(30) Foreign Application Priority Data

Jun. 7, 2007    (KR) .................. 10-2007-0055338

(51) Int. Cl.
*H04B 3/36* (2006.01)
(52) U.S. Cl. ............... 340/407.1; 340/388.1; 340/384.1; 310/81; 310/17; 310/14; 381/396; 381/417
(58) Field of Classification Search ............... 340/407.1, 340/388.1, 384.1; 381/417, 396; 310/12, 310/17, 13, 14, 15, 16, 18, 19, 20, 36, 38, 310/81
See application file for complete search history.

(56) References Cited

U.S. PATENT DOCUMENTS 4,065,188 A  *  12/1977  Ridler et al. ................ 310/90.5
(Continued)

FOREIGN PATENT DOCUMENTS

JP    2004-195444    7/2004
(Continued)

OTHER PUBLICATIONS

Korean Office Action issued on Nov. 27, 2008 in corresponding Korean Patent Application 10-2007-0055338.

*Primary Examiner* — Hoi Lau (57) ABSTRACT

A linear vibration generator is disclosed. The linear vibration generator may include: a stator having a coil, which induces a magnetic field when an electric current is applied; an oscillator having a magnet, which has one side facing the coil; a spring member, which is joined to the stator, and which elastically supports the oscillator such that the oscillator moves linearly; a damper, which prevents the oscillator from contacting the stator according to the linear motion of the oscillator; and a guide portion, which guides the linear motion of the oscillator. This linear vibration generator makes it possible to generate stable linear vibration, prevent generation of touch noise when the oscillator impacts the stator, and prevent right/left vibration due to an external impact.

9 Claims, 5 Drawing Sheets

U.S. PATENT DOCUMENTS

| | | | |
|---|---|---|---|
| 5,861,686 A * | 1/1999 | Lee | 310/36 |
| 5,973,422 A * | 10/1999 | Clamme | 310/36 |
| 6,377,145 B1 * | 4/2002 | Kumagai | 335/274 |
| 6,777,895 B2 * | 8/2004 | Shimoda et al. | 318/114 |
| 7,038,335 B2 * | 5/2006 | Choi et al. | 310/12.24 |
| 7,244,090 B2 * | 7/2007 | Wooten et al. | 414/466 |
| 7,358,633 B2 * | 4/2008 | Kweon et al. | 310/81 |
| 2001/0005296 A1 * | 6/2001 | Sakuragi et al. | 360/99.08 |
| 2003/0011929 A1 * | 1/2003 | Nii et al. | 360/99.08 |
| 2004/0071308 A1 * | 4/2004 | Guenther | 381/409 |
| 2005/0184601 A1 * | 8/2005 | Kweon et al. | 310/36 |
| 2005/0215295 A1 * | 9/2005 | Arneson et al. | 455/575.1 |
| 2005/0285453 A1 * | 12/2005 | Oh et al. | 310/14 |
| 2005/0285454 A1 * | 12/2005 | Choi et al. | 310/14 |
| 2006/0043800 A1 * | 3/2006 | Yasuda | 310/49 R |
| 2007/0145832 A1 * | 6/2007 | Shimizu et al. | 310/15 |
| 2009/0146509 A1 * | 6/2009 | Aoyagi et al. | 310/15 |
| 2011/0018366 A1 * | 1/2011 | Choi | 310/25 |
| 2011/0062801 A1 * | 3/2011 | Choi et al. | 310/17 |
| 2011/0089773 A1 * | 4/2011 | Choi | 310/25 |
| 2011/0133578 A1 * | 6/2011 | Choi | 310/25 |

FOREIGN PATENT DOCUMENTS

| | | |
|---|---|---|
| KR | 2005-0122101 | 12/2005 |
| KR | 2006-0046360 | 5/2006 |

* cited by examiner

LINEAR VIBRATION GENERATOR

CROSS-REFERENCE TO RELATED APPLICATIONS

This application claims the benefit of Korean Patent Application No. 10-2007-0055338 filed with the Korean Intellectual Property Office on Jun. 7, 2007, the disclosure of which is incorporated herein by reference in its entirety.

BACKGROUND

1. Technical Field

The present invention relates to a linear vibration generator.

2. Description of the Related Art

There are many types of vibration generator apparatus used in electronic devices such as cellular phones, game consoles, and portable digital assistant, etc., as an alternative to creating sound effects, which can cause discomfort to other persons. In particular, such vibration generator apparatus is mounted in cellular phones for use in generating silent call signals, and in accordance with the trends in current cellular phones towards smaller sizes and slimmer shapes, there is a growing demand for vibration generator apparatus that provides smaller sizes and greater functionality.

The vibration generator apparatus, as one of the means for indicating call signals employed in communication equipment such as cellular phones, is a component that converts electrical energy into mechanical vibration using the generation of electromagnetic forces. The vibration generator apparatus may be mounted in cellular phones to be used as a silent call signal indicator.

The vibration generator apparatus according to the related art may use a method of obtaining mechanical vibration by rotating an oscillator having an eccentric mass. The driving force can be generated by providing an electric current to a coil in the oscillator through a contact point between the brush and the commutator, by way of rectifying actions.

However, the vibration generator apparatus according to the related art induces mechanical friction and electrical sparks, when the brush passes the segments of the commutator and the electrodes between the segments. This can lead to the creation of foreign substances, such as black powder, which reduce the durability of the vibration generator apparatus.

SUMMARY

An aspect of the invention is to provide a linear vibration generator, which can generate linear vibration in a stable manner.

Another aspect of the invention is to provide a linear vibration generator, which can prevent noise that may occur when an oscillator impacts the stator due to an excessive vibration of the oscillator, and which can prevent right and left vibration due to an outside impact.

One aspect of the invention provides a linear vibration generator that includes: a stator having a coil, which induces a magnetic field when an electric current is applied; an oscillator having a magnet, which has one side facing the coil; a spring member, which is joined to the stator, and which elastically supports the oscillator such that the oscillator moves linearly; a damper, which prevents the oscillator from contacting the stator according to the linear motion of the oscillator; and a guide portion, which guides the linear motion of the oscillator.

In cases where a portion of the magnet is inserted inside the coil, the damper may include a first cushion, which may be joined to the side of the stator facing the one side of the magnet. Also, the damper may include a second cushion, which may be joined to the side of the stator facing the other side of the magnet.

The damper may include a magnetic fluid which may be converged in correspondence with a magnetic flux of the magnet.

The guide portion may include a tube, in which a hollow portion may be formed. In this case, the coil may be wound around the tube. Also, the guide portion may further include a lubricating belt formed on an outer perimeter of the magnet.

A portion of the lubricating belt may be in contact with an inner perimeter of the hollow portion of the tube.

The lubricating belt may include a magnetic fluid belt, which may be formed along an outer perimeter of the magnet by a magnetic flux of the magnet.

The stator may include: a case, in which an inner space may be formed; and a bracket, which may secure the coil, and which may seal the inner space of the case; and the oscillator may include: a yoke, in which a hollow portion may be formed with one side closed in, and which may hold the magnet in the hollow portion; and a mass, which is joined to the outside of the yoke.

Additional aspects and advantages of the present invention will be set forth in part in the description which follows, and in part will be obvious from the description, or may be learned by practice of the invention.

DETAILED DESCRIPTION

The linear vibration generator according to certain embodiments of the invention will be described below in more detail with reference to the accompanying drawings, in which those components are rendered the same reference number that are the same or are in correspondence, regardless of the figure number, and redundant explanations are omitted.

Figure 1:
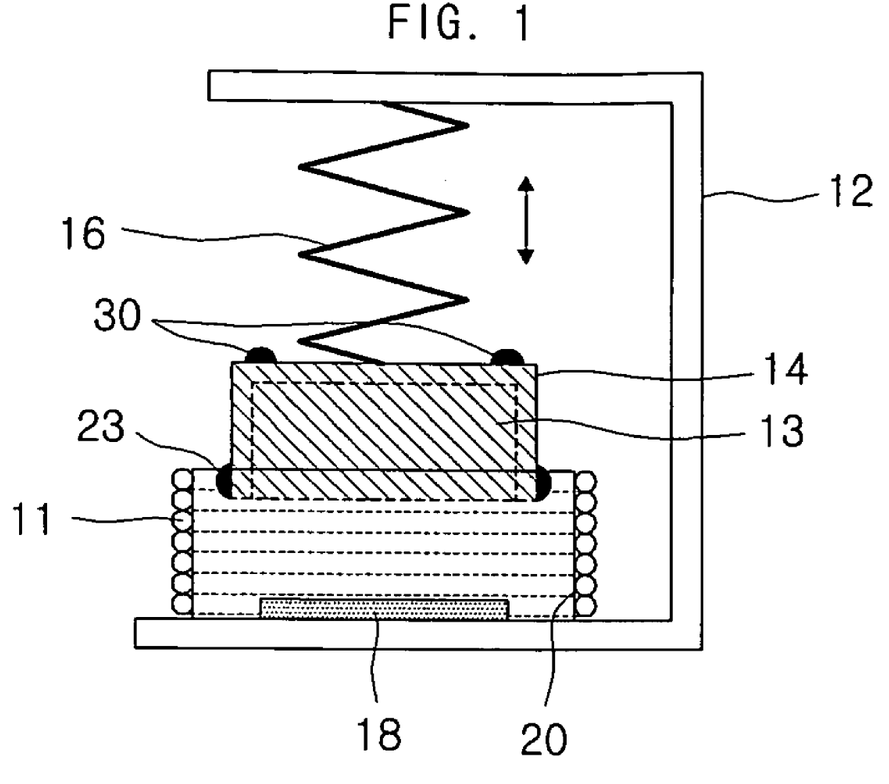
FIG. 1 is a diagram illustrating a linear vibration generator according to an embodiment of the invention.

FIG. 1 is a diagram illustrating a linear vibration generator according to an embodiment of the invention. In FIG. 1, there are illustrated a coil 11, a stator 12, a magnet 13, an oscillator 14, a spring member 16, a damper 18, a guide portion 20, a lubricating belt 23, and a magnetic fluid 30.

A linear vibration generator according to an embodiment of the invention may include a stator 12 having a coil 11 which induces a magnetic field when an electric current is applied; an oscillator 14 having a magnet 13, where one side of the magnet 13 faces the coil 11; and a spring member 16, which joins to the stator 12, and which elastically supports the oscillator 14 such that the oscillator 14 moves linearly; a damper 18, which prevents the oscillator 14 from contacting the stator 12 according to the linear motion of the oscillator 14; and a guide portion 20, which guides the linear motion of the oscillator 14. This linear vibration generator makes it possible to generate stable linear vibration, and to prevent generation of touch noise that may occur when the oscillator 14 impacts the stator 12, as well as to prevent right/left vibration due to an outside impact. Here, the oscillator 14 and the stator 12 are relative concepts, and the stator 12 is to encompass those parts that remain fixed in relation to the oscillator 14 in which the vibration occurs, while the oscillator 14 is to encompass those parts that vibrate in relation to the stator 12.

Looking at the principle of the linear vibration, as illustrated in FIG. 1, an oscillator 14, which includes a magnet 13, may be joined to a spring member 16, which elastically supports the oscillator 14 such that the oscillator 14 moves in a linear motion. A coil 11, which induces a magnetic field with the application of an electric current, may be arranged on the bottom of the oscillator 14, at which an electromagnetic force may be applied, generating linear vibration in the oscillator 14. In this case, the coil 11 may be positioned within the magnetic field of the magnet 13.

When the electromagnetic force is applied by the coil 11, the magnetic flux passing through the coil 11 from the magnet 13 may be formed in rightward and leftward directions, while the magnetic field generated by the coil 11 may be formed in upward and downward directions, to vibrate the oscillator 14 upwards and downwards. Therefore, the direction of the magnetic flux of the magnet 13 is perpendicular to the direction of vibrating of the oscillator 14.

When the electromagnetic force is applied in an eigenfrequency of the oscillator 14, resonance vibration occurs, which provides a maximum amount of vibration. The eigenfrequency of the oscillator 14 is affected by the mass (m) of the oscillator 14 and the spring constant (k) of the spring member 16, as indicated below in [formula 1]:

$$F = \frac{1}{2\pi}\sqrt{\frac{k}{m}}$$ [formula 1]

When the oscillator 14 vibrates linearly, as represented by the arrow illustrated in FIG. 1, in accordance with the method described above, excessive vibrating of the oscillator 14 may cause the oscillator 14 to come into contact with the stator 12 and generate touch noise. Thus, a damper 18 may be arranged to prevent the oscillator 14 from making direct contact with the stator 12.

Also, as an external impact can cause the oscillator 14 to generate rightward and leftward vibrations, a guide portion 20 can be arranged such that the right and left vibration is prevented and the oscillator 14 is made to move in a linear motion. In this way, minor vibrations caused by the right and left vibration may be avoided.

The stator 12 may include a coil 11, which may induce a magnetic field when an electric current is applied. The magnetic field can be induced around the coil 11 by applying an electric current of a particular frequency to the coil 11.

The oscillator 14 may include a magnet 13, where the oscillator 14 can be made to vibrate linearly by the electromagnetic induction resulting from the magnetic flux of the magnet 13 and the coil 11. That is, the oscillator 14 can be made to vibrate in a linear motion by the interaction between the spring member 16, which provides elastic support, the magnet 14 of the oscillator 14, and the coil 11 of the stator 12.

A yoke (not shown) can be arranged on either side of the magnet 13 to induce the magnetic field at a constant intensity.

The damper 18 can prevent the generation of touch noise, which may occur when the oscillator 14 impacts the stator 12 due to excessive linear vibration of the oscillator 14. The damper 18 can be arranged in a position on the stator 12 facing the oscillator 14, to absorb the vibration of the oscillator 14.

A first cushion and a second cushion can be used as the damper 18, which may prevent direct contact between the oscillator and the stator 12, and which may absorb the impact.

In this embodiment, one side of the magnet 13 may be arranged to face the coil 11, and a portion of the magnet 13 including the one side may be inserted in a space formed by the coil 11. As such, the damper 18 may be arranged on a side of the stator 12 facing the one side of the magnet 13, to prevent the contact of the magnet 13 due to excessive linear vibration of the oscillator 14. Also, the damper 18 may be arranged on a side of the stator 12 facing the other side of the magnet 13. For example, if the oscillator 14 vibrates upwards and downwards, a first cushion may be arranged as the damper 18 on a lower part of the stator 12, and a second cushion may be arranged on an upper part of the stator 12, to prevent touch noise that may be caused by the upwards and downwards vibration of the oscillator 14.

Various materials capable of absorbing the vibration of the oscillator 14, such as rubber, cork, polypropylene, etc., can be used for the first cushion and the second cushion.

The damper 18 may include a magnetic fluid 30 which converges in correspondence with the magnetic flux of the magnet 13. The magnetic fluid 30 can be a material being of such quality that the magnet fluid converges according to the magnetic flux of the magnet 13. If the magnet fluid 30 is applied on one side of the magnet 13, the magnet fluid 30 may converge at the position where the magnetic flux of the magnet 13 is generated to form an annular ring. This magnetic fluid 30 can be formed on an upper side of the spring member 16 corresponding to the magnet 13. For example, in cases where the spring member 16 is a flat spring, the other side of the magnet 13 may be placed in contact with the flat spring, and then as the magnetic fluid is applied, the magnetic field of the magnet 13 may manifest on the upper side of the contacting portion of the flat spring, such that the magnetic fluid 30 may be formed in the shape of an annular ring. This magnetic fluid 30 may prevent direct contact between the stator 12 and the oscillator 14 during the vibration of the oscillator 14 and may absorb touch noise and impact.

The magnetic fluid 30 can be made by stabilizing and dispersing magnet powder in a fluid in the form of a colloid, and adding a surfactant in order that the magnetic powder does not precipitate or condense due to gravity or due to a magnetic field, etc. Examples of magnetic fluid may include magnetite, iron-cobalt alloy particles dispersed in oil or water, as well as cobalt dispersed in toluene. The magnetic powder may be ultra-fine particles of 0.01 to 0.02 μm, and may display Brownian motion, characteristic of such particles. The magnetic powder may be such that maintains a uniform concentration within a fluid, even when an external magnetic forces, gravitational forces, or centrifugal forces, etc., are applied.

The guide portion 20 may induce the linear motion of the oscillator 14 to prevent right and left vibration in the event of an external impact. This guide portion 20 may include a tube having a hollow portion, in which the magnet 13 may be inserted. The hollow portion can be formed in the tube so as to provide a linear motion for the magnet 13, and to thus guide the linear motion of the magnet 13. For example, if the magnet 13 has a cylindrical form, the hollow portion can be formed as a cylinder-shaped tube, where the cylindrical magnet 13 may be inserted through the hollow portion of the cylinder-shaped tube and guided to follow only a linear motion. In this way, right and left vibration may be prevented. Here, the coil 11 may be wound around the outer perimeter of the tube to improve convenience in assembly.

Also, the guide portion 20 may include a lubricating belt 23 formed on the outer perimeter of the magnet 13. The lubricating belt 23 may fill the gap between the outer surface of the magnet 13 and the inner perimeter of the hollow portion of the tube, so that the magnet 13 may slide smoothly. The lubricating belt 23 may include a magnetic fluid belt formed along the outer perimeter of the magnet 13 by the magnetic flux of the magnet 13. The magnetic fluid belt can be formed around the outer perimeter of the magnet 13 by applying a magnetic fluid that converges in correspondence to the magnetic flux of the magnet 13. That is, a particular gap may be formed between the outer perimeter of the magnet 13 and the inner perimeter of the hollow portion, and the magnetic fluid belt may be formed in the gap around the outer perimeter of the magnet 13 due to the magnetic flux of the magnet 13.

On the other hand, in cases where one side of the hollow portion of the tube is closed, and the magnet 13 is inserted through the other side, the hollow portion may be sealed in terms of airflow, so that the resulting vacuum may hinder the linear motion of the oscillator 14. Therefore, in such cases, the lubricating belt can be made to contact only a portion of the hollow portion. For example, the hollow portion may be formed to be in correspondence with only a portion of the outer perimeter of the magnet 13, and the magnetic fluid belt may be formed along the outer perimeter of the magnet 13, such that the magnetic fluid can be in contact with a portion of the inner perimeter of the hollow portion.

Figure 2:
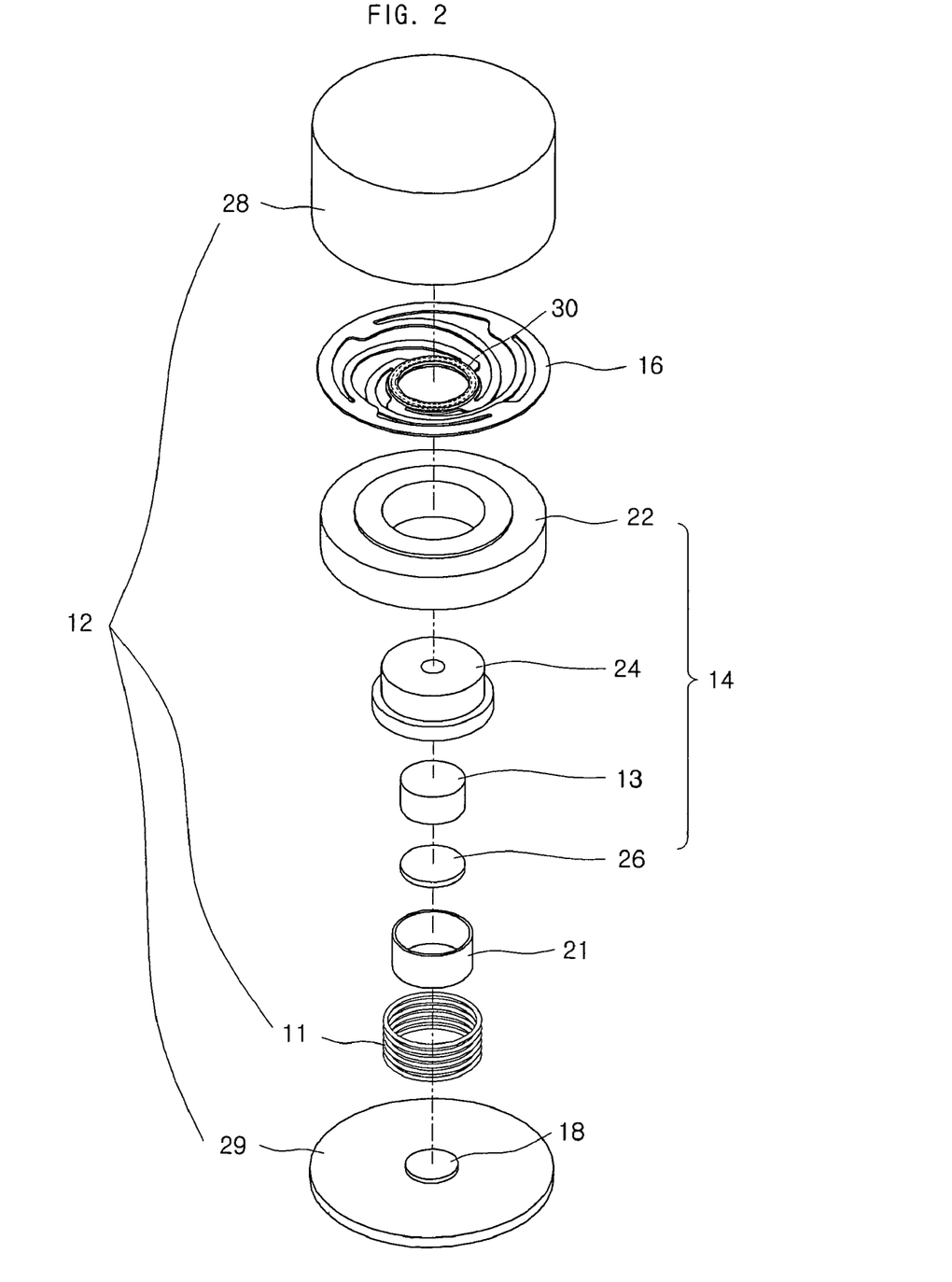
FIG. 2 is a perspective view illustrating a linear vibration generator according to another embodiment of the invention.
Figure 3:
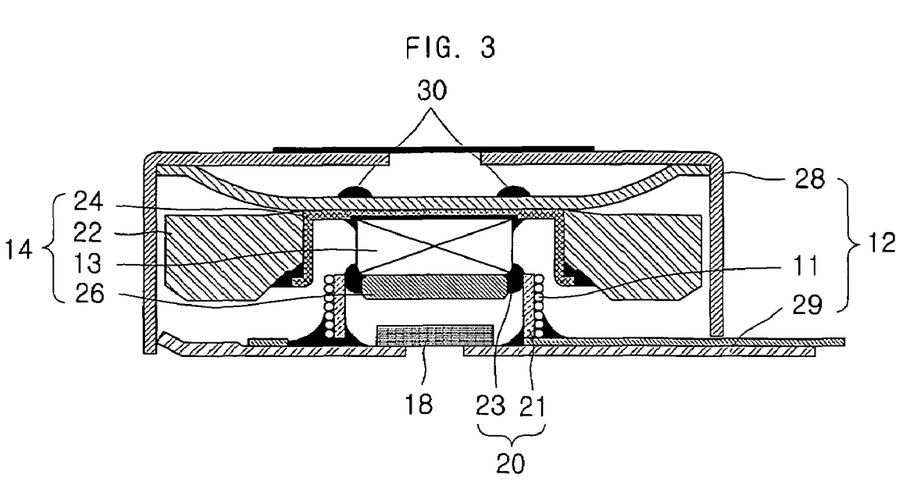
FIG. 3 is a cross-sectional view illustrating a linear vibration generator according to another embodiment of the invention.
Figure 4:
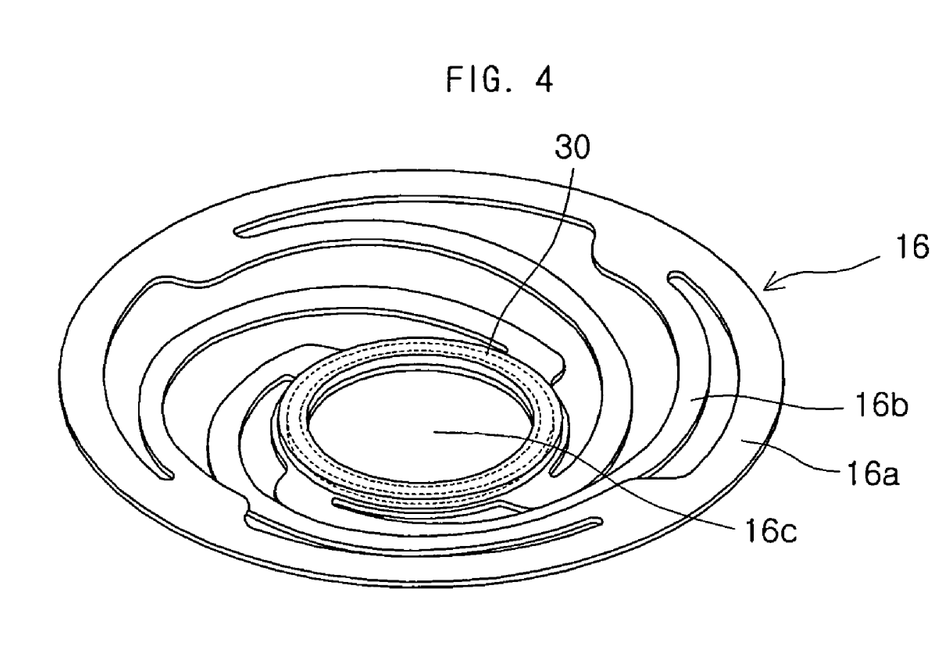
FIG. 4 is a perspective view illustrating a spring member having magnetic fluid according to another embodiment of the invention.
Figure 5:
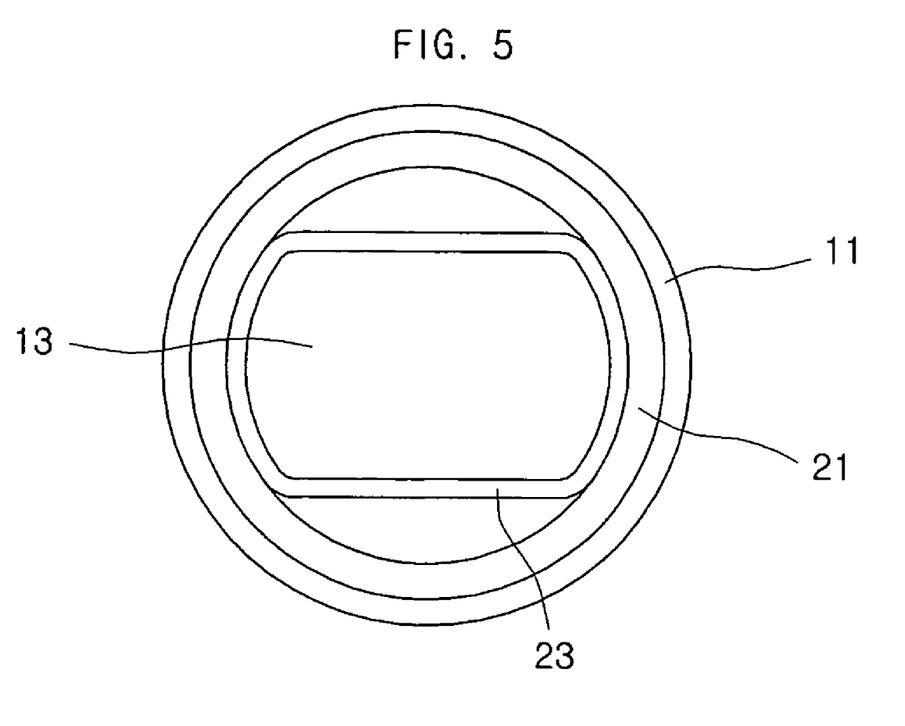
FIG. 5 is a plan view illustrating a guide portion according to another embodiment of the invention.

FIG. 2 is a perspective view illustrating a linear vibration generator according to another embodiment of the invention, FIG. 3 is a cross-sectional view illustrating a linear vibration generator according to another embodiment of the invention, FIG. 4 is a perspective view illustrating a spring member having magnetic fluid according to another embodiment of the invention, and FIG. 5 is a plan view illustrating a guide portion according to another embodiment of the invention. In FIG. 2 through FIG. 5, there are illustrated a coil 11, a stator 12, a magnet 13, an oscillator 14, a spring member 15, a securing ring 16a, elastic legs 16b, a disk 16c, a damper 18, a guide portion 20, a tube 21, a lubricating belt 23, a mass 22, a yoke 24, a plate yoke 26, a case 28, a bracket 29, and a magnetic fluid 30.

A linear vibration generator according to the embodiment may include: a stator 12; an oscillator, which moves linearly with respect to the stator 12; a spring member 15, which is joined to the stator 12, and which elastically supports the oscillator 14 such that the oscillator 14 moves linearly; a damper 18, which prevents contact with the stator 12 according to the linear motion of the oscillator 14; and a guide portion 20, which guides the linear motion of the oscillator 14. The stator 12 may include: a case 28, in which an inner space is formed; a coil 11; a bracket, on which the coil 11 is secured, and which closes the inner space of the case 28. The oscillator 14 may include a magnet 13; a yoke 24, which holds the magnet 13, and in which a hollow portion with one side of the hollow portion closed.

The case 28 may be a holding member, which may have an inner space of a particular size. The lower portion of the case 28 may be open downwards and may be sealed by a bracket 29. At least one or more inlet hole of a particular size may be formed through the case 28, through which a magnetic fluid 30 can be applied over a spring member 16 held in the case 28.

One end of the spring member 16 can be secured on the case 28 and the other end can be secured to the oscillator 14 to elastically support the oscillator 14 such that the oscillator 14 moves linearly. The spring constant may affect the eigenfrequency of the oscillator 14.

The spring member 16 may be a flat spring, as illustrated in FIG. 4. The spring member 16 may include: an annular securing ring 16a, which may be secured on the lower side of the inner space of the case 28; multiple elastic legs 16b, which may each have one end joined to the securing ring 16a and extending in a spiral-direction to generate an elastic force; and a disk 16c, to which the other ends of the elastic legs 16b may be joined, and which may be secured on the upper side of the yoke 24 of the oscillator 14.

The top and the bottom of the magnet 13, as illustrated in the drawing, may be magnetized to have different poles, to generate a magnetic force of a particular intensity. The magnet 13 may be held in the hollow of the yoke 24 of which one side is closed in.

A hollow portion, of which one side is closed in, may be formed in the yoke 24, while the other side of the magnet 13 may join to the closed side of the hollow portion and held in the hollow portion. A particular space can be formed between the inner perimeter of the hollow portion of the yoke 24 and the outer perimeter of the magnet 13, and an upper portion of the coil 11 may be inserted in the space. A portion of the magnet 13 can be inserted in an inside of the coil 11. Then, a plate yoke 26 can be attached to one side of the magnet 13. The yoke 24 and plate yoke 26 may facilitate the induction of the magnetic flux of the magnet 13.

A mass 22 can be joined to an outer side of the yoke 24. A through-hole 21 may be formed in the middle of the mass 22, in which the body of the yoke 24 may be inserted and secured. The mass 22 adds a particular mass to the oscillator 14 for the linear motion. The mass may have an external diameter smaller than an inner diameter of the case 28. The mass 22 can have a specific gravity of 18 or higher, and can be made of a non-magnetic material, so as not to be affected by the magnetic force of the magnet 13.

The guide portion may guide the linear motion of the oscillator 14 to prevent right and left vibration that may occur due to an external impact. The guide may include a tube 21 having a hollow portion in which the magnet 13 may be inserted, and a lubricating belt 23 which may be formed on the outer perimeter of the magnet 13. The hollow portion corresponding with the outer perimeter of the magnet 13 may be formed to guide the linear motion of the magnet 13. For example, if the magnet 13 has a cylindrical form, the hollow portion can be formed as a cylinder-shaped tube, where the cylindrical magnet 13 may be inserted through the hollow portion of the cylinder-shaped tube and guided to follow only a linear motion. In this way, right and left vibration may be prevented.

Also, a lubricating belt 23 can be formed on the outer perimeter of the magnet 13 such that a gap between the outer side of the magnet 13 and the inner side of the hollow portion may be filled and the magnet 13 may slide smoothly. For example, a particular gap may be formed between the outer perimeter of the magnet 13 and the inner perimeter of the hollow portion, and a magnetic fluid belt may be formed in the gap around the outer perimeter of the magnet 13 by the magnetic flux of the magnet 13. On the other hand, in cases where one side of the hollow portion of the tube is closed, and the magnet 13 is inserted through the other side, the hollow portion may be sealed in terms of airflow, so that the resulting vacuum may hinder the linear motion of the oscillator 14. Therefore, in such cases, the lubricating belt can be made to contact only a portion of the hollow portion, as illustrated in FIG. 5. For example, the hollow portion may be formed to be in correspondence with only a portion of the outer perimeter of the magnet 13, and the magnetic fluid belt may be formed along the outer perimeter of the magnet 13, such that the magnetic fluid can be in contact with a portion of the inner perimeter of the hollow portion.

The coil 11 may be arranged to face the magnet 13, and may induce a magnetic field when an electric current is applied from the outside. The coil 11 may be wound around the outer perimeter of the tube 21 to improve assembly. The upper side of the tube 21 around which the coil 11 may be wound can be arranged between the inner side of the hollow portion of the yoke 24 and the outer side of the magnet 13, to facilitate the interaction between the magnetic field of the magnet 13 and the magnetic field of the coil 11.

The damper 18 can prevent the generation of touch noise, which may occur when the oscillator 14 impacts the stator 12 due to excessive linear vibration of the oscillator 14. The damper 18 can be arranged in a position on the stator 12 facing the oscillator 14, to absorb the vibration of the oscillator 14.

A first cushion and a second cushion can be used as the damper 18, which may prevent direct contact between the oscillator and the stator 12, and which may absorb the impact.

In this embodiment, one side of the magnet 13 may be arranged to face the coil 11, and a portion of the magnet 13 including the one side may be inserted in a space formed by the coil 11. As such, the damper 18 may be arranged on a side of the stator 12 facing the one side of the magnet 13, to prevent the contact of the magnet 13 due to excessive linear vibration of the oscillator 14. Also, the damper 18 may be arranged on a side of the stator 12 facing the other side of the magnet 13. For example, if the oscillator 14 vibrates upwards and downwards, a first cushion may be arranged on a lower part of the stator 12, and a second cushion may be arranged on an upper part of the stator 12, to prevent touch noise that may be caused by the upwards and downwards vibration of the oscillator 14.

Various materials capable of absorbing the vibration of the oscillator 14, such as rubber, cork, polypropylene, etc., can be used for the first cushion and the second cushion.

The damper 18 may include a magnetic fluid 30 which converges in correspondence with the magnetic flux of the magnet 13. The magnetic fluid 30 can be a material being of such quality that the magnet fluid converges according to the magnetic flux of the magnet 13. If the magnet fluid 30 is applied on one side of the magnet 13, the magnet fluid 30 may converge at the position where the magnetic flux of the magnet 13 is generated to form an annular ring. This magnetic fluid 30 can be formed on an upper side of the spring member 16 corresponding to the magnet 13. That is, as illustrated in FIG. 4, the magnetic field of the magnet 13 located below the yoke 24 may manifest on the disk 16c of the spring member 16 secured to an upper side of the yoke 24 of the oscillator 14, and when the magnetic fluid 30 is applied, the magnetic fluid 30 may be positioned in the shape of an annular ring. This magnetic fluid 30 may prevent direct contact between the stator 12 and the oscillator 14 during the vibration of the oscillator 14 and may absorb touch noise and impact.

According to certain aspects of the invention as set forth above, this linear vibration generator can prevent the occurrence of touch noise that may occur due to excessive vibration of the oscillator, and can prevent right and left vibration of the oscillator to obtain stable linear vibration.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A linear vibration generator comprising:
   a stator having a coil, the coil inducing a magnetic field with an application of an electric current;
   an oscillator having a magnet and a plate yoke, the magnet moving in a linear motion to be inserted in the coil, and the plate yoke being attached to one side of the magnet;
   a spring member joined to the stator and elastically supporting the oscillator such that the oscillator undergoes linear motion; and
   a magnetic fluid belt formed along an outer perimeter of the magnet by a magnetic flux of the magnet,
   wherein the plate yoke is configured to converge the magnetic flux of the magnet and maintain the magnetic fluid belt by using the converged magnetic flux.

2. The linear vibration generator of claim 1, further comprising a damper preventing the oscillator from contacting the stator according to the linear motion of the oscillator.

3. The linear vibration generator of claim 2, wherein a portion of the magnet is inserted in an inside of the coil, and the damper comprises a first cushion joined to a side of the stator facing one side of the magnet.

4. The linear vibration generator of claim 3, wherein the damper comprises a second cushion joined to a side of the stator facing the other side of the magnet.

5. The linear vibration generator of claim 2, wherein the damper comprises a magnetic fluid converging in correspondence with a magnetic flux of the magnet.

6. The linear vibration generator of claim 1, further comprising a tube having a hollow portion formed therein, and wherein the magnet is inserted through the hollow portion.

7. The linear vibration generator of claim 6, wherein the coil is wound around the tube.

8. The linear vibration generator of claim 6, wherein a portion of the magnetic fluid belt is in contact with an inside of the hollow portion of the tube.

9. The linear vibration generator of claim 1, wherein the stator comprises:
   a case having an inner space; and
   a bracket securing the coil and sealing the inner space of the case,
   a lubricating belt comprises:
      the magnetic fluid belt formed along an outer perimeter of the magnet by a magnetic flux of the magnet, and
   the oscillator comprises:
      a yoke having a hollow portion formed therein and holding the magnet in the hollow portion, the hollow portion having one side thereof closed in, and
      a mass joined to an outside of the yoke.

* * * * *